US008681915B2

(12) United States Patent
Buhl et al.

(10) Patent No.: US 8,681,915 B2
(45) Date of Patent: Mar. 25, 2014

(54) METHOD FOR TRANSMITTING SYNCHRONIZATION MESSAGES IN A COMMUNICATION NETWORK

(75) Inventors: Michael Bernhard Buhl, Grafing (DE); Dragan Obradovic, Ottobrunn (DE); Günter Steindl, Poppenricht (DE); Philipp Wolfrum, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/607,197

(22) Filed: Sep. 7, 2012

(65) Prior Publication Data
US 2013/0243140 A1 Sep. 19, 2013

(30) Foreign Application Priority Data
Sep. 9, 2011 (EP) .................................... 11180739

(51) Int. Cl.
*H04L 7/04* (2006.01)
(52) U.S. Cl.
USPC ........... 375/362; 375/260; 375/262; 375/265; 375/267; 375/374; 375/375
(58) Field of Classification Search
USPC .......... 375/260, 262, 265, 267, 362, 374, 375
See application file for complete search history.

(56) References Cited

U.S. PATENT DOCUMENTS 7,689,854 B2 * 3/2010 Ilnicki et al. .................. 713/400
2009/0086766 A1 * 4/2009 Gotz et al. .................... 370/503

OTHER PUBLICATIONS

Chongning NA et al: "Clock synchronization based on distributed hidden state estimation", Precision Clock Synchronization for Measurement, Contorl and Communication, 2009. ISPCS 2009. International Symposium on, IEEE, Piscataway, NJ, USA, Oct. 12, 2009, pp. 1-6; Others.

* cited by examiner

*Primary Examiner* — Dhaval Patel
(74) *Attorney, Agent, or Firm* — Cozen O'Connor

(57) ABSTRACT

A method for transmitting synchronization messages in a communications network including a plurality of nodes having a first node and at least one second node, wherein in order to take into account differences in a reference clock frequency of a reference clock and an internal clock frequency of an internal clock of the at least one second node, a compensation interval, with which the second clock count state is adjusted on measurement of a delay time, is subdivided into smaller compensation timespans, and the smaller compensation timespans are used to determine a compensated time value for the delay time with a high degree of accuracy, where the compensated time value is then used to update the time information in the synchronization message.

16 Claims, 3 Drawing Sheets

-- Prior Art --

METHOD FOR TRANSMITTING SYNCHRONIZATION MESSAGES IN A COMMUNICATION NETWORK

BACKGROUND OF THE INVENTION

1. Field of the Invention

The invention relates to a method for transmitting synchronization messages in a communications network and a node in a communications network and a corresponding communications network.

2. Description of the Related Art

In many technical fields, communications networks are used to perform distributed processes automatically on a plurality of units. Particularly in industrial automation networks, it is very important that the automatic processes are precisely matched to one another. To this end, the individual nodes in the communications network comprise suitable clocks that are synchronized to a reference clock in a reference node. The reference node is also often known as the master node, whereas the other nodes with internal clocks are designated slave nodes.

Protocols known from the prior art for synchronizing the clocks in a communications network are defined Institute of Electrical and Electronics Engineers (IEEE) industrial standard 1588, 1588v2 and 802.1AS, and International Electrotechnical Commission (IEC) standard 61158. According to these protocols, synchronization messages are exchanged as packets having time stamps. A synchronization message issued by the master node is passed on successively between the slave nodes. The synchronization message issued by the master node contains a time stamp of the first clock count state according to the reference clock at the time of issuing of the message. The slave nodes process this information and issue further synchronization messages. Each slave node adds the estimated delays between the issue time point of the synchronization message in the previous node and the issuing time of the node in question at the first clock count state in the received synchronization message. The clock count state resulting therefrom is inserted into the synchronization message to be issued. A slave node can possibly also store the first clock count state from the synchronization message issued by the master node in a first field and add the estimated delays in a separate second field. Based on the information in the received synchronization messages, each slave node can synchronize the second clock count states thereof according to the internal clock thereof to the first clock count states thereof according to the reference clock.

The internal clocks in the slave nodes usually do not exactly match the reference clock of the master node. As a result, the ratio of the reference clock frequency to the internal clock frequency is estimated in each slave node. This ratio, which is also designated the rate compensation factor (RCF) value, is used to stipulate relevant compensation intervals. For the measurement of a delay in the respective slave, based on the internal clock thereof, the second clock count state thereof is always changed when the measured delay exceeds the end point of a compensation interval. This method has the disadvantage that the delay times thereby determined only partially compensate for the deviations between the internal clock of the slave and the reference clock of the master. For example, no compensation of the delay time occur at all if the delay time lies within a compensation interval. There is also significantly too much compensation if a very short delay time exceeds the end point of a compensation interval.

SUMMARY OF THE INVENTION

It is therefore an object of the invention to provide a method for transmitting synchronization messages in which the time information contained therein is determined with a high degree of accuracy.

This and other objects and advantages are achieved in accordance with the invention by providing a method for transmitting synchronization messages in a communications network comprising a plurality of nodes, where the plurality of nodes comprises a first node and at least one second node. The first node generates first clock count states according to a reference clock frequency of a reference clock and the at least one second node generates second clock count states according to an internal clock frequency. In accordance with the method of the invention, synchronization messages are transmitted, starting from the first node, successively from one node to another node and each synchronization message contains time information that serves to synchronize the internal clocks of the at least one second node with the reference clock. In the at least one second node, the time information of the synchronization message is updated, based on a delay time, to the transmission time point of the synchronization message in each second node.

In accordance with the method of the invention, in each second node of at least part of the at least one second node, the delay times measured therein are suitably changed to take into account differences between the reference clock frequency and the internal clock frequency. Compensation intervals based on sequential compensation time points are pre-defined in a per se known manner, so that adjustment of at least one time segment of the delay time that is measured in the at least one second node according to the internal clock frequency of the second node to the reference clock frequency can be performed by changing the second clock count states. The expression "can be performed" makes clear that, in accordance with the method of the invention, this adjustment can be performed or not performed, depending on the particular application instance. It is necessary, however, that a suitable compensation interval is defined.

In accordance with the method of the invention, the compensation intervals are each subdivided into smaller compensation timespans, based on a number of second compensation time points, where the number of overshoots of the first and second compensation time points is recorded through the at least one time segment. For the at least one time segment, a compensated time value is determined in that the time value according to the number of second clock count states counted within the at least one time segment is changed by the product of the number of overshoots and a compensation time unit. Here, the compensation time unit corresponds to the duration period of the internal clock frequency of a respective second node (i.e., the time interval between two adjacent second clock count states) divided by the number of compensation timespans within a compensation interval. The compensated time value is then used to update the time information in the synchronization message. Depending on whether the reference clock runs faster or slower than the respective internal clock of the at least one second node, the above time value is increased or decreased by the product according to the number of second clock count states.

The above expression of the time value or the compensation time unit should be understood broadly. Preferably, this value or unit relates to a time value in seconds or correspondingly smaller time units (e.g., nanoseconds). The time value can also be represented by a number of further clock count states, where the interval between adjacent further clock states corresponds to a compensation time unit.

The method in accordance with the invention is based on the concept that the time information in the synchronization messages is usually provided in a higher resolution than the clock frequency of the internal clock of the corresponding second node. This principle is utilized to introduce (virtual) second compensation time points, on the basis of which a compensation interval is divided into smaller intervals. As a result, a more precise adjustment of a corresponding time segment of the delay time is achieved, so that the corresponding delay time is determined with greater accuracy.

In a particularly preferable embodiment, the adjustment of the at least one time segment of the delay time according to the internal clock frequency of the respective second node to the reference clock frequency as described above can be performed such that, in the event that the at least one time segment exceeds a first compensation time point, the number of second clock count states that are counted for the at least one time segment until the first compensation time point is exceeded, is changed by a second clock count state. As a result, a compensation is already achieved during the measurement of the at least one time segment of the delay time.

In another particularly preferred embodiment of the method in accordance with the invention, determination of the compensated time value occurs such that, in the event that the at least one time segment exceeds a second compensation time point, the time value is changed, according to the number of second clock count states counted within the at least one time segment until the second compensation time point is exceeded, by the compensation time unit. In the presently contemplated embodiment, a suitable compensation is also performed on measurement of the at least one time segment.

As mentioned above, the adjustment of the at least one time segment of the delay time, according to the internal clock frequency of the respective second node to the reference clock frequency can either be performed, or not performed. In the event that the adjustment is performed, in a preferred embodiment for the event that the at least one time segment exceeds a first compensation time point, the adjustment is reversed. This ensures that erroneous compensation based both on the compensation interval and also on the compensation timespans does not occur.

In another embodiment of the method in accordance with the invention, the adjustment of the at least one time segment of the delay time according to the internal clock frequency of the respective second node to the reference clock frequency is actually performed, and for this purpose, the embodiment described above is used in which, on exceeding a first compensation time point, the number of second clock states is altered by a second clock count state. In the presently contemplated embodiment, the compensated time value is preferably determined such that, if the at least one time segment exceeds a first compensation time point, the time value according to the number of second clock count states counted within the at least one time segment until the first compensation time point is exceeded and changed, based on the adjustment, is corrected by the time value according to the time difference between the period duration of the internal clock frequency of the respective second node and the compensation time unit.

In another embodiment of the invention in which the above-described adjustment of the at least one time segment according to the internal clock frequency of the respective second node to the reference clock frequency is not performed, the determination of the compensated time value occurs in that, in the event that the at least one time segment exceeds a first compensation time point, the time value is changed by the compensation time unit, according to the number of second clock count states counted within the at least one time segment until the first compensation time point is exceeded. That is, exceeding the first compensation time points is treated similarly to exceeding the second compensation time points.

In a further embodiment of the method in accordance with the invention, the at least one time segment is an internal processing time in each second node between reception of the synchronization message and transmission of the synchronization message. This timespan is usually designated 'Bridge Delay'. The possibility may also exist of compensating for the timespan between transmitting a synchronization message in the previous two nodes and reception of the synchronization message in the second node under observation. However, because this timespan, which is also known as 'Line Delay', is very short, compensation for the delay can be dispensed with altogether.

The method in accordance with the contemplated embodiments of the invention is preferably based on one of the aforementioned IEEE 1588 or IEEE 1588v2 or IEC 61158 or IEEE 802.1AS standards. In particular, the disclosed embodiments of the invention are based on the IEC 61158 ed2.0 Type 10 standard, which defines the Precision Transparent Clock Protocol (PTCP). The aforementioned IEEE 802.1AS standard is a derivative of the Precision Time Protocol (PTP) PTPv2. The IEEE 1588 standard concerns the PTPv1 or PTPv2 protocol.

In another embodiment, the nodes communicate within the communications network based on the known PROFINET standard. Furthermore, the method in accordance with the disclosed embodiments of the invention is preferably used in a communications network of an industrial automation system.

It is also an object of the invention to provide a node for use as a second node in the disclosed embodiments of the method in accordance with the invention or in one or more preferred embodiments of the method in accordance with the disclosed embodiments of the invention. That is, compensation intervals are pre-defined in the node, and the node can calculate, by correspondingly smaller compensation timespans, a compensated time value that is used for updating the time information in the synchronization message.

It is also an object of the invention to provide a communications network comprising a plurality of nodes, where the communications network includes a first node and at least one second node in accordance with the invention. The communications network is preferably configured to perform at least one embodiment of the method in accordance with the invention as described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention will now be described in detail making reference to the attached figures, in which.

DETAILED DESCRIPTION OF THE PREFERRED EMBODIMENTS

The method in accordance with the invention is preferably used in an industrial automation system, where the distributed components of the system communicate with one another to control production sequences, such as in automobile manufacturing. For this purpose, the individual components communicate with one another via a communications network wirelessly and/or through cables. The components therefore represent network nodes of the communications network.

Figure 1:
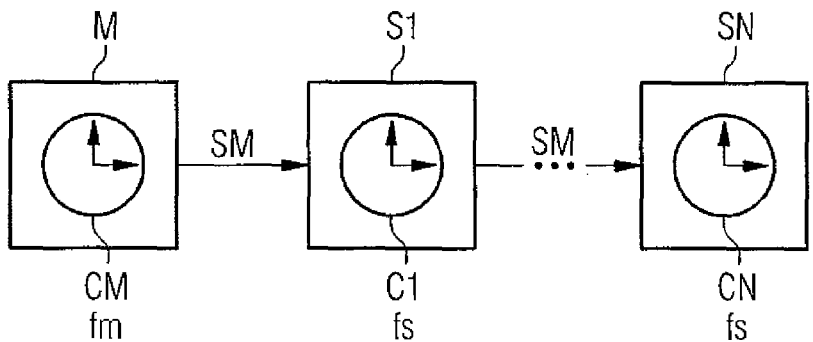
FIG. 1 is a schematic block diagram illustrating a plurality of network nodes in a communications network, between which synchronization messages are transmitted in accordance with the method of the invention.

In the embodiment depicted in FIG. 1, the network nodes used are, for example, the 'slaves' S1 to SN, where each slave has a corresponding internal clock C1, ..., CN. Each of the clocks functions at a pre-defined slave clock frequency fs, which can also be different for different slaves. Furthermore, a 'master element' M or 'master', having a reference clock CM that transmits a reference clock frequency fm to which all the internal clocks C1, ..., CN of the slaves are to be matched. In order to achieve the matching, synchronization messages SM are transmitted by the master element M. Each synchronization message contains time information based on the clock CM, where the time information represents the time elapsed since the issuance of the synchronization message from the master element at the transmission time point of the synchronization message in the respective slave.

The master element M and the individual network nodes S1 to SN communicate with one another in sequence, where synchronization messages are transmitted from the master element M to the node S1 and therefrom to the node S2, etc., as far as the node SN. In order to achieve exact synchronization in the individual slaves, the clock count state must be updated in the synchronization messages SM in the individual slaves. Therefore, the time delay necessary between the issuing of a synchronization message from the preceding slave (or from the master element) until the issuing of the synchronization message from the respective slave to the respective next slave is estimated in each slave. This time delay is made up from the timespans LD and BD together, where the timespans possibly are different for each slave. LD is the timespan that is required for transferring the message from the preceding slave Si−1 to the next slave Si (LD=Line Delay). BD is the processing time needed in the slave Si for processing a received synchronization message until the issuance of the synchronization message to the next slave (BD=Bridge Delay). This delay time is given in the respective slave in clock cycles according to the slave clock frequency.

When the bridge delay (BD) or the line delay (LD) is calculated, it must be considered that the quartz frequency of the internal clock of a slave does not match the quartz frequency of the reference clock of the master element exactly.

It is assumed below that the master element and an individual slave are clocked the same and therefore, in the ideal case, the quartz frequencies are also identical. However, the following observations are also applicable if the clocking of the master element is different from the clocking of the slave element. In this case, the corresponding quartz ticks in the master or the slave must be multiplied by a corresponding factor that produces the different clock speeds.

In order, when determining the line delay and/or the bridge delay, to take into account deviations in the quartz frequencies, the ratio of the quartz frequencies between the master element and the slave is estimated. This ratio is designated the RCF (RCF=Rate Compensation Factor) and is defined in accordance with the following relationship:

$$RCF = \frac{\Delta\text{Master}}{\Delta\text{Slave}} \quad \text{Eq. (1)}$$

$\Delta$Master and $\Delta$Slave each denote the number of quartz ticks that elapse in the master or slave within an (absolutely) equal time period. Using this value, a slave can convert a timespan measured locally by the slave into a timespan according to the time of the master element in accordance with the following relationship:

$$\Delta t_{Monster} = RCF \cdot \Delta t_{Slave} \quad \text{Eq. (2)}$$

In the presently described embodiment, using the RCF value, the bridge delay is corrected, in order thereby to obtain an exact value for the delay, which is then inserted into the synchronization message. The line delay can also be correspondingly corrected if appropriate. In accordance with the herein described embodiment, the correction is not performed for the line delay, due to the brevity thereof.

The above conversion of the time difference of a slave into the time difference of the master is not performed directly via Eq. (2) but, rather, an 'RCF interval' $T_{RCF}$ is used, which states after how many local quartz ticks or clock count states of the slave the quartz thereof has to adjust forward or backward by one tick, so that the quartz has then made exactly as many ticks or clock count states as the master. The RCF interval is defined in accordance with the following relationship:

$$T_{RCF} = \frac{1}{RCF - 1} \quad \text{Eq. (3)}$$

The master and the slave have the same clock rate or different clock rates have already been calculated out. Consequently, the value of RCF is in the region of 1, and is greater than 1 if the master runs somewhat faster than the slave and smaller than 1 if the master runs somewhat slower than the slave. The interval $T_{RCF}$ is a number of clock count states or ticks which, in the event that the clock of the master element runs faster than the slave, is positive and, otherwise, is negative.

Figure 2:
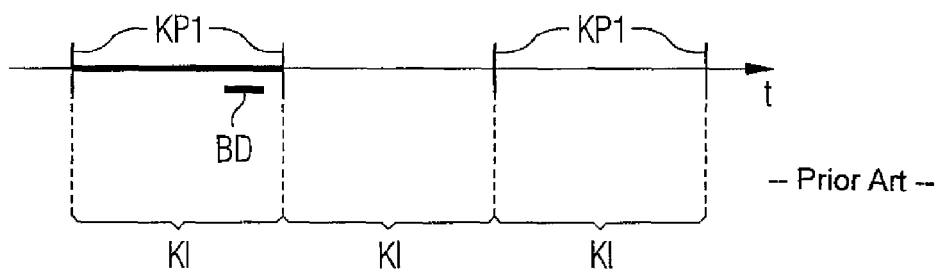
FIG. 2 is a graphical plot illustrating a conventional determination of time delays in a network node of a communications network in accordance with the prior art.

Based on the RCF interval, which is also designated the compensation interval below, in accordance with the prior art, the clock count states of the respective slave are adjusted, as will now be described making reference to FIG. 2. With specific reference to FIG. 2, shown therein is a plurality of successive (constant) compensation intervals KI along the time axis t, the length of which corresponds to the above described time $T_{RCF}$ measured in a corresponding number of clock count states of the slave. The individual compensation intervals KI start and end at corresponding (first) compensation time points KP1. Within the compensation interval KI, at the start of the time axis, the bridge delay BD, which is significantly shorter than the compensation interval, is detected by the slave. If the bridge delay BC extends beyond a compensation time point KP1, then the clock count state of the slave is increased or decreased by 1, and the clock count state is decreased if the value of $T_{RCF}$ is negative, and is increased if the value of $T_{RCF}$ is positive.

A major disadvantage of the procedure for adjusting the clock count states described with reference to FIG. 2 is that each detected time interval that is longer or shorter than the compensation interval KI is falsely converted. This is made clear for the bridge delay DB in FIG. 1. As shown in FIG. 2, the bridge delay BD is completely contained within the compensation interval KI. Here, no compensation for the bridge delay occurs, i.e., the delay is not adjusted in any way to the clock of the master element. If the bridge display BD extends over a compensation time point, this timespan is altered by a whole clock count state and is therefore significantly overcompensated, which also does not lead to a correctly adjusted value.

The local quartz of a slave is free-running and is not set to 0 at the start of a bridge delay in a defined manner. Accordingly, compensation of the local quartz occurs in a random manner during detection of the bridge delay in the slave. The probability of compensation is identified hereafter as $p_0$ and, with bridge delays smaller than $T_{RCF}$, is found from the length $T_{BD}$ of the bridge delay in clock count states of the slave and from the RCF value $T_{RCF}$ in accordance with the following relationship:

$$p_0 = \frac{T_{BD}}{|T_{RCF}|} \quad \text{Eq. (4)}$$

In contrast to the conventional procedure described above, in the embodiment of the method in accordance with the invention described subsequently, the bridge delay is adjusted significantly more accurately to the clock of the master element. Account is taken of the fact that the time stamps that are conveyed in the synchronization message are given in a greater temporal resolution than the clock in the slave. If the temporal resolution of the clock of a slave is 10 ns (100 MHz quartz), then the time stamps within the synchronization message typically have a resolution in the region of 1 ns. This better resolution is taken into account in accordance with the disclosed embodiments of the method of the invention in that the compensation interval KI shown in FIG. 2 is still more finely subdivided, where the subdivision is chosen so as to be capable of being resolved within the synchronization messages. This is illustrated clearly in FIG. 3.

Figure 3:
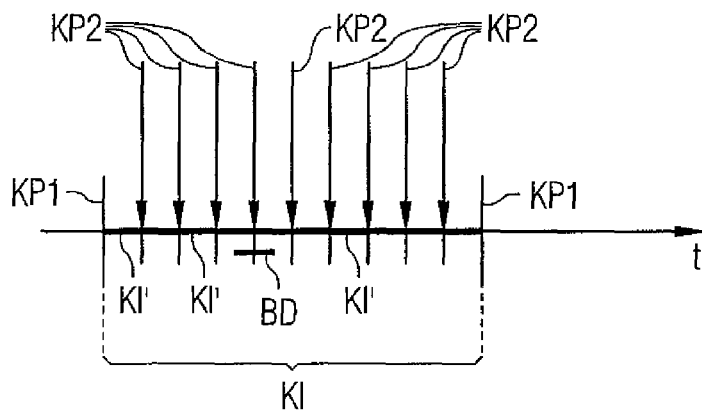
FIG. 3 is a graphical plot illustrating the determination of time delays in a network node of a communications network in accordance with an embodiment of the invention.

In FIG. 3, similarly to FIG. 2, a compensation interval KI is shown along the time axis t, corresponding to a compensation interval of FIG. 2. The corresponding compensation time points KP1 at the start and end of this interval are shown. Furthermore, the bridge delay BD measured in the slave node is indicated. It is assumed that an exemplary period of the slave clock frequency is 10 ns, whereas time stamps in the synchronization message are given with a resolution of 1 ns. The resolution of the time stamp is thus ten times greater than the resolution according to the slave clock frequency. Consequently, the compensation interval KI is now subdivided into ten equal-sized smaller compensation intervals or compensation timespans KI'. This is performed in that suitable virtual (second) compensation time points KP2 are introduced, lying between the compensation time points KP1 of the original compensation interval KI. With the aid of the virtual compensation time points KP2, the conversion from the time system of the slave into the time system of the master element occurs, specifically with the temporal resolution of the time stamp of one nanosecond. The following two variants can be used for the conversion.

In the first embodiment, the counter or clock count state S for the quartz of the slave continues to be adjusted by one increment at the original compensation time points KP1. In this case, a second counter C is introduced. This counter is set to 0 at the start of the time measurement of a bridge delay. If a virtual compensation time point KP2 is overshot, the counter C is increased or decreased by one increment (according to the sign preceding $T_{RCF}$). If an actual compensation time point KP1 is overshot, the counter is decremented or incremented by nine increments, in order thereby to take account of the compensation performed at the time point KP1. According to this compensation, the clock count state of the slave is incremented or decremented by one (and thus by 10 ns).

The conversion of the time measurement $\Delta S = S(t_2) - S(t_1)$, which corresponds to the number of clock count states of the slave between the start t1 and the end t2 of the bridge delay, into the time of the master system, is therefore carried out as follows:

$$T_{BD} = \Delta S \cdot 10 \text{ ns} + C \cdot 1 \text{ ns}$$

$$\Delta S = S(t_2) - S(t_1) \quad \text{Eq. (5)}$$

$T_{BD}$ is a time value that is given with a resolution of one nanosecond and can therefore be resolved in the synchronization message.

In a second embodiment of the conversion from the slave time system into the master time system, the clock count state or the counter S for the quartz of the slave is no longer changed at the original compensation time points KP1, but rather the counter runs freely up at the frequency of the slave. In this case, a second counter is also introduced, although the second counter counts differently. Similarly to the second counter of the first embodiment, the second counter is set to 0 at the start of the time measurement of a bridge delay. This counter is also increased or decreased by one increment on exceeding a virtual compensation time point KP2, depending on whether the quartz of the master element runs faster or slower than the quartz of the slave. In contrast to the first variant, however, the counter C is also increased or decreased by one increment on exceeding an original compensation time point KP1, because at this time point, no compensation based on a clock count state of a slave is performed.

The conversion of the time measurement $\Delta S$ from the slave system into the master system is again performed similarly to the first embodiment, in accordance with the following relationship:

$$T_{BD} = \Delta S \cdot 10 \text{ ns} + C \cdot 1 \text{ ns}$$

$$\Delta S = S(t_2) - S(t_1) \quad \text{Eq. (5)}$$

As stated above, in accordance with the disclosed embodiments of the method of the invention, the compensation between the clock of a slave and the clock of the master element is no longer linked to the temporal resolution of the slave, but rather is selected having regard to the resolution of the time stamp transmitted by the master element. The essential advantage of the presently contemplated embodiment of the method in accordance with the invention is that the error on conversion between the slave time system and the master time system is substantially reduced. This is shown by FIGS. 2 and 3 for the bridge delay BD shown there, which is not compensated for at all in the method of FIG. 2, whereas in FIG. 3, compensation by a nanosecond occurs. The improved conversion has an overall positive effect because the synchronization messages are transmitted in a linear topology, successively from one slave to the next, starting from the master element. As a result, a synchronization message runs through all the slaves, so that the errors of all the slaves are added together.

The improvement achieved with the embodiments of the method in accordance with the invention will now be described again using an example. It is assumed that all slaves have the same bridge delay and the same RCF interval. If this is the case, a probability distribution p(i,m) can be given for the number i of compensations that a synchronization message experiences along the route from the master until the message leaves a slave having the number m. This probability distribution is expressed in accordance with the following relationship:

$$p(i, m) = p_0^m \cdot (1 - p_0)^{i-m} \cdot \binom{i}{m} (= \text{binomial distribution}) \quad \text{Eq. (6)}$$

Figure 4:
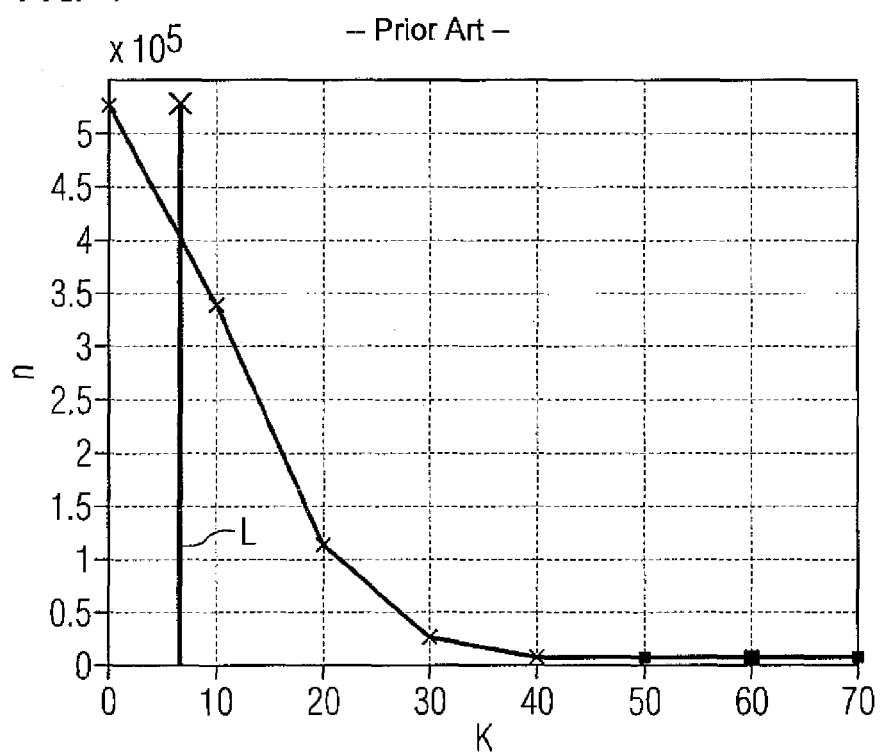
FIGS. 4 and 5 are graphical plots illustrating the properties of a known method and of an embodiment of the method in accordance with the invention.

Also, $$p_0 = \frac{T_{BD}}{|T_{RCF}|}$$

is the probability for each slave that a correction of the quartz of the slave occurs during the measurement of the bridge delay BD. FIG. 4 shows, for the conventional method of FIG. 2 which takes into account only the compensation intervals KI, for the slave having the number 64, the expected distribution of compensations for one million synchronization messages. That is, in FIG. 4, along the abscissa, the number K of compensations and along the ordinate, the corresponding occurrence frequencies n of the compensations are shown. The following values are assumed for the RCF interval $T_{RCF}$ or for the bridge delay:

$T_{RCF}$=0.001 sec $T_{BD}$=10 μsec ⟹ $p_0$=0.001 (7)

Figure 5:
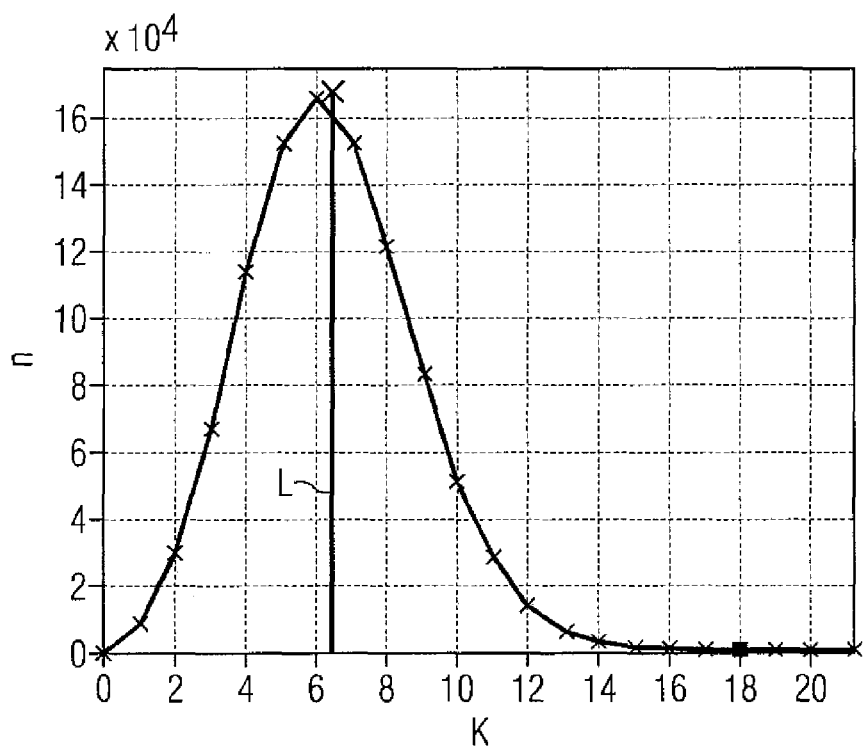

FIG. 5 shows the frequencies n of the compensations K for the slave having the number 64, where the compensations based on FIG. 3 is now performed not only at the compensation time points KP1, but also at the compensation time points KP2. This is achieved by a suitable shortening of the interval $T_{RCF}$ to the length of the compensation interval KI'.

The respective lines L in the two distributions of FIGS. 4 and 5 mark the expected values for the number of compensations. This is identical for both methods and found as $p_0 \cdot 10$ ns·64=6.4 ns. As is made clear by a comparison of FIGS. 4 and 5, however, the scatter is reduced by the method of FIG. 5 around the expected value. Thus, the synchronization error to be expected in the context of the RCF compensation, which is represented in the graphs of FIGS. 4 and 5 by the difference between the expected value according to the line L and the curve of the frequency distribution, is significantly reduced by the method in accordance with the invention.

Figure 6:
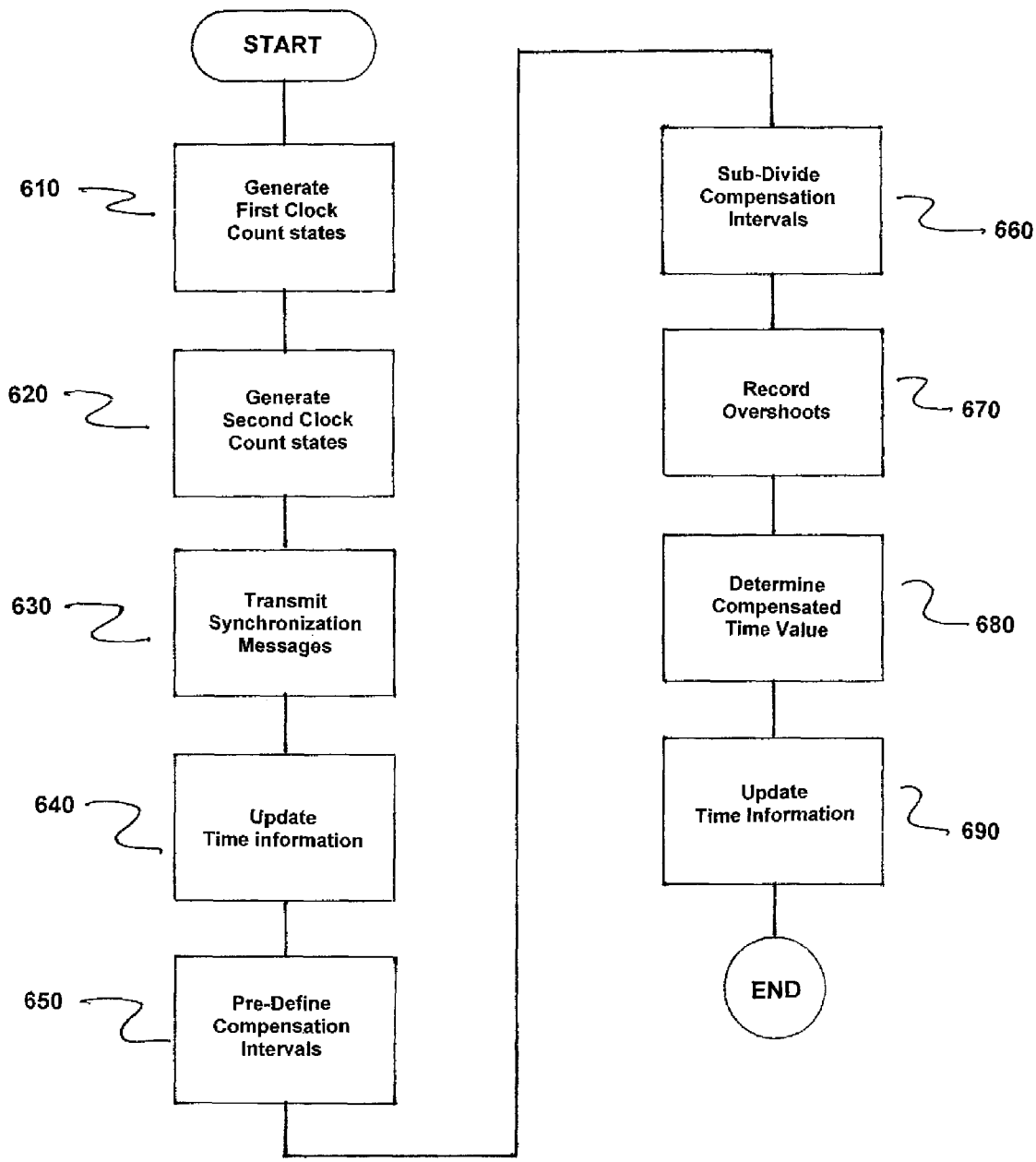
FIG. 6 is a flow chart of the method in accordance with the invention.

FIG. 6 is flowchart of a method for transmitting synchronization messages (SM) in a communications network including a plurality of nodes comprising a first node and at least one second node. The method comprising generating, by the first node, first clock count states according to a reference clock frequency of a reference clock, as indicated in step 610.

Second clock count states are generated by the at least one second node according to an internal clock frequency of an internal clock, as indicated in step 620.

Starting from the first node, synchronization messages are successively transmitted from one node of the plurality of nodes to another node of the plurality of nodes, as indicated in step 630. Here, each synchronization message contains time information for synchronizing the internal clock of the at least one second node with the reference clock.

Time information of the synchronization message is updated in the at least one second node to the transmission time of the synchronization message in a respective second node, based on a delay time, as indicated in step 640.

Compensation intervals are then pre-defined based on sequential compensation time points in at least part of the at least one second node, so that adjustment of at least one time segment of the delay time according to the internal clock frequency of the respective second node to the reference clock frequency is performable by changing the second clock count states, as indicated in step 650.

Each compensation interval is sub-divided into smaller compensation timespans based on a number of second compensation time points, as indicated in step 660. A number of overshoots of the first and second compensation time points through the at least one time segment are recorded, as indicated in step 670.

A compensated time value is determined for the at least one time segment in which a time value according to a number of second clock count states counted within the at least one time segment is changed by a product of the number of overshoots and a compensation time unit corresponding to a duration period of the internal clock frequency of the respective second node divided by a number of compensation timespans within a compensation time interval, as indicated in step 680. Time information in the synchronization message is then updated based on the compensated time value, as indicated in step 690.

While there have been shown and described and pointed out fundamental novel features of the invention as applied to a preferred embodiment thereof, it will be understood that various omissions and substitutions and changes in the form and details of the methods and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting synchronization messages (SM) in a communications network including a plurality of nodes comprising a first node and at least one second node, the method comprising the steps of:

generating, by the first node, first clock count states according to a reference clock frequency of a reference clock;

generating, by the at least one second node, second clock count states according to an internal clock frequency of an internal clock;

transmitting synchronization messages, starting from the first node, successively from one node of the plurality of nodes to another node of the plurality of nodes, each synchronization message containing time information for synchronizing the internal clock of the at least one second node with the reference clock;

updating, in the at least one second node, time information of the synchronization message, based on a delay time, to the transmission time of the synchronization message in a respective second node;

pre-defining compensation intervals based on sequential compensation time points in at least part of the at least one second node, so that adjustment of at least one time segment of the delay time according to the internal clock frequency of the respective second node to the reference clock frequency is performable by changing the second clock count states;

subdividing each compensation interval into smaller compensation timespans based on a number of second compensation time points;

recording a number of overshoots of the first and second compensation time points through the at least one time segment;

determining, for the at least one time segment, a compensated time value in which a time value according to a number of second clock count states counted within the at least one time segment is changed by a product of the number of overshoots and a compensation time unit corresponding to a duration period of the internal clock frequency of the respective second node divided by a number of compensation timespans within a compensation time interval; and updating the time information in the synchronization message based on the compensated time value.

2. The method as claimed in claim 1, wherein the adjustment of the at least one time segment of the delay time according to the internal clock frequency of the respective second node to the reference clock frequency is performable such that, in an event that the at least one time segment exceeds a first compensation time point, the number of second clock count states counted for the at least one time segment until the first compensation time point is exceeded, is changed by the compensation time unit.

3. The method as claimed in claim 1, wherein the time value is changed by the compensation time unit, according to the number of second clock count states counted within the at least one time segment until the second compensation time point is exceeded to determine the compensated time value in an event that the at least one time segment exceeds a second compensation time point.

4. The method as claimed in claim 2, wherein the time value is changed by the compensation time unit, according to the number of second clock count states counted within the at least one time segment until the second compensation time point is exceeded to determine the compensated time value in the event that the at least one time segment exceeds a second compensation time point.

5. The method as claimed in claim 1, further comprising the steps of:
performing the adjustment of the at least one time segment of the delay time, according to the internal clock frequency of the respective second node to the reference clock frequency; and
reversing the adjustment in an event that the at least one time segment exceeds a first compensation time point.

6. The method as claimed in claim 2, further comprising the steps of:
performing the adjustment of the at least one time segment of the delay time according to the internal clock frequency of the respective second node to the reference clock frequency; and
correcting, by the time value according to a time difference between the duration period of the internal clock frequency of the respective second node and by the compensation time unit, the time value according to the number of second clock count states which are counted within the at least one time segment until the first compensation time point is exceeded and which are changed based on the adjustment if the at least one time segment exceeds a first compensation time point.

7. The method as claimed in claim 1, wherein an adjustment of the at least one time segment of the delay time according to the internal clock frequency of the respective second node to the reference clock frequency is not performed, the method further comprising:
adjusting, by the compensation time unit, the time value according to the number of second clock count states counted within the at least one time segment until the first compensation time point is exceeded if the at least one time segment exceeds the first compensation time point.

8. The method as claimed in claim 1, wherein the at least one time segment is an internal processing time in the at least one second node between reception of the synchronization message and transmission of the synchronization message.

9. The method as claimed in claim 1, wherein the time synchronization is based on one of Electrical and Electronics Engineers standards 1588, 1588v2, 802.1AS and International Electrotechnical Commission standard 61158.

10. The method as claimed in claim 1, wherein the plurality of nodes communicate with one another based on a PROFINET standard.

11. The method as claimed in claim 1, wherein the method is implemented in an industrial automation system.

12. A node for use as a second node in a method for transmitting synchronization messages in a communications network having a plurality of nodes comprising a first node and at least one second node, the first node generating first clock count states according to a reference clock frequency of a reference clock and the at least one second node generating second clock count states according to an internal clock frequency of an internal clock, wherein synchronization messages are transmitted, starting from the first node, successively from one node of the plurality of nodes to another node of the plurality of nodes and each synchronization message contains time information which serves to synchronize the internal clock of the at least one second node with the reference clock,
wherein in each second node, time information of the synchronization message is updated, based on a delay time, to a transmission time point of the synchronization message in a respective second node, and
wherein the node is configured such that, during operation of said node:
compensation intervals based on sequential compensation time points are pre-defined, so that adjustment of at least one time segment of the delay time according to the internal clock frequency of the respective second node to the reference clock frequency is performable by changing the second clock count states;
the compensation intervals are each subdivided into smaller compensation timespans based on a number of second compensation time points, a number of overshoots of the first and second compensation time points being recorded through the at least one time segment, and for the at least one time segment, a compensated time value is determined, and the time value according to the number of second clock count states counted within the at least one time segment is changed by a product of the number of overshoots and a compensation time unit corresponding to the duration period of the internal clock frequency of the respective second node divided by a number of compensation timespans within a compensation time interval, the compensated time value being used for updating the time information in the synchronization message.

13. The node as claimed in claim 12, wherein the node is further configured to adjust the at least one time segment of the delay time according to the internal clock frequency of the respective second node to the reference clock frequency such that, in an event that the at least one time segment exceeds a first compensation time point, the number of second clock count states counted for the at least one time segment until the first compensation time point is exceeded, is changed by the compensation time unit.

14. A communications network comprising a plurality of nodes comprising a first node and at least one second node, wherein during operation of the communications network, the first node generates first clock count states according to a reference clock frequency of a reference clock and the at least one second node generates second clock count states according to an internal clock frequency of an internal clock;

wherein synchronization messages are transmitted, starting from the first node, successively from one node of the plurality of nodes to another node of the plurality of nodes and each synchronization message contains time information for synchronizing the internal clock of the at least one second node with the reference clock;

wherein in each second node, the time information of the synchronization message is updated, based on a delay time, to a transmission time point of the synchronization message in a respective second node; and wherein the at least one second node comprises the node as claimed in claim 12.

15. The communications network as claimed in claim 14, wherein the at least one second node is further configured to adjust the at least one time segment of the delay time according to the internal clock frequency of the respective second node to the reference clock frequency such that, in an event that the at least one time segment exceeds a first compensation time point, the number of second clock count states counted for the at least one time segment until the first compensation time point is exceeded, is changed by the compensation time unit.

16. The communications network as claimed in claim 14, wherein the communications network is configured to adjust the at least one time segment of the delay time according to the internal clock frequency of the respective second node to the reference clock frequency such that, in an event that the at least one time segment exceeds a first compensation time point, the number of second clock count states counted for the at least one time segment until the first compensation time point is exceeded, is changed by the compensation time unit.

* * * * *